United States Patent Office 3,442,573
Patented May 6, 1969

3,442,573
VARIFOCAL CINEMATOGRAPHIC OBJECTIVE FOR LARGE-FRAME SIZES AND INCLUDING A FOUR-COMPONENT FORWARD LENS GROUP AND A FOUR-LENS REAR GROUP
Karl Macher, Bad Kreuznach, Germany, assignor to Jos. Schneider & Co., Bad Kreuznach, Germany
Filed Sept. 21, 1965, Ser. No. 488,957
Claims priority, application Germany, Sept. 25, 1964, Sch 35,848
Int. Cl. G02b 1/00, 11/34
U.S. Cl. 350—176        2 Claims

ABSTRACT OF THE DISCLOSURE

A varifocal optical system for motion-picture cameras designed to provide large-frame sizes, e.g., of 4.22 x 5.69 mm. for 8 mm. film, and having a wide varifocal range. The system includes a forward lens group with a positive fixed first lens, a movable negative second lens, a movable negative third lens and a positive fourth lens. The rear-lens group has four air-spaced lenses.

---

Figure 1:
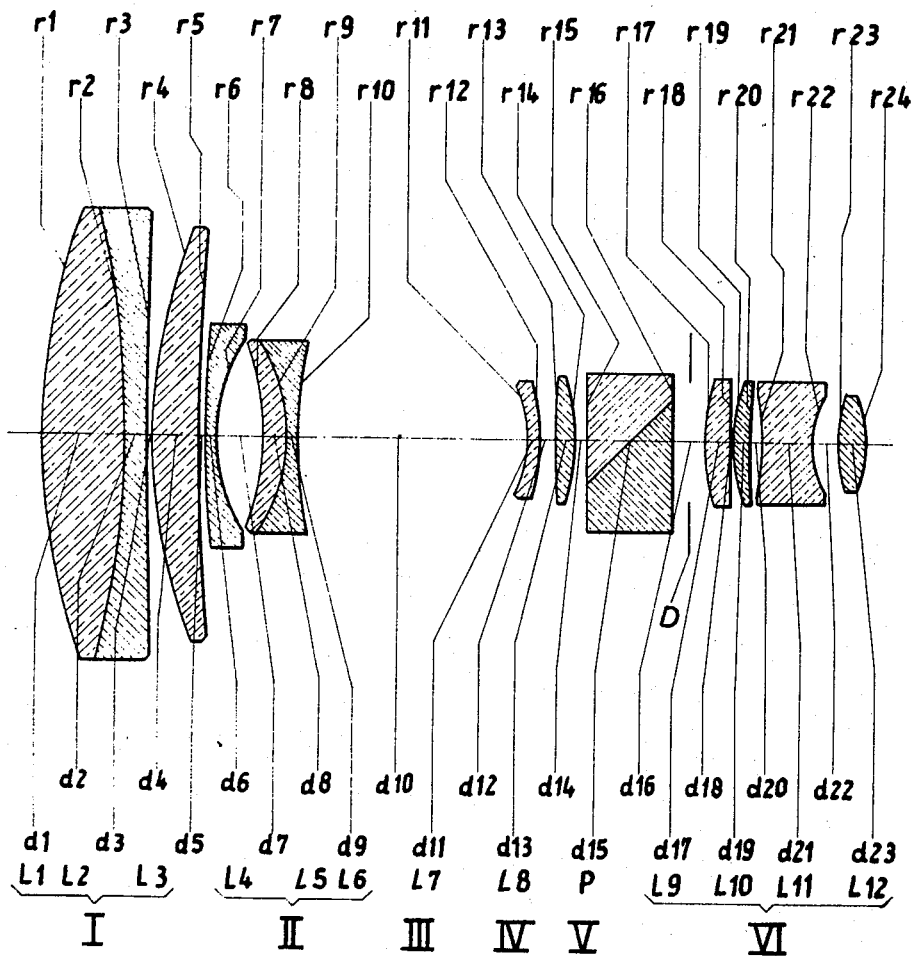

My present invention relates to a varifocal optical objective system for photographic or cinematographic cameras, more specifically a system of the type wherein a fixed rear lens group, constituting a basic or principal objective, is preceded by a varifocal lens group composed of two stationary positive components bracketing two movable negative components; the term "stationary," especially as applied to the positive components of the varifocal group, is not meant to exclude a limited adjustability of all or part of that component for focusing purposes.

In U.S. Patent No. 3,057,257, issued Oct. 9, 1962, to G. Klemt and me, there has been disclosed a varifocal system of this general type with an aperture ratio of 1:2.8 and a varifocal ratio of about 1:4, the individual focal length of the fixed positive rear component of the varifocal group being equal to or less than 75% of the individual focal length of the positive front component while the rearwardly positioned movable negative component has an individual focal length exceeding by at least 10% that of the more forward negative component immediately preceding it.

An improvement over this patented system is the subject matter of my copending application Ser. No. 295,851, filed July 17, 1963 ( now U.S. Patent 3,346,320), in which I have disclosed an optical system of this general type especially adapted for 8-mm. motion-picture cameras. The particular embodiment disclosed in my prior application has a relative aperture of 1:1.4 and a varifocal ratio of 1:6. Inherently, however, that system is optically effective only with the hitherto customary frame sizes which in 8-mm. film conventionally measure 3.6 x 4.9 mm.

The general object of my present invention is to provide a further improvement whereby systems of the type described in the aforementioned U.S. Patent No. 3,057,257 can be adapted to the recently introduced proportionally larger frame sizes of motion-picture film, such as frames of 4.22 x 5.69 mm. in the case of 8-mm. film, with a relative aperture and a varifocal range at least approaching those of the system disclosed in my copending prior application.

In such an improved system the first movable component consists of two air-spaced dispersive lens members each having a concave rear surface directed toward the shorter conjugate (i.e., image side) of the system, the first one of these members being meniscus-shaped as likewise shown in my copending application; the second member advantageously is an achromatic doublet of biconcave shape. The ratio of the absolute magnitudes of the radius of curvature of the rear surface of this second dispersive member to that of the radius of the immediately succeeding optical surface, i.e., the front surface of a negative lens member constituting the second movable component, ranges between substantially 80% of the ratio of the individual focal lengths of the second and first movable components and substantially ten times the reverse ratio, i.e., that of the individual focal lengths of the first and second movable components. Furthermore, the absolute magnitude of the radius of curvature of the concave rear surface of the first member of the first movable component is so related to that of the radius of the preferably positively refracting and rearwardly convex cemented surface of the achromatic doublet that the ratio thereof ranges between subtsantially 5% and 15% of the absolute value of the individual focal length of this movable component. The relatively wide frames described above are, with such a lens system, fully illuminated even at minimum focal length which, in the case of a system designed for 8-mm. film, may range upwardly from a minimum of 7 or 8 mm. to a maximum equaling 5 to 8 times that minimum.

The two lens groups of a system according to my invention are separated by an air space large enough to accommodate one or more optical accessories such as a diaphragm and/or a reflex prism serving, for example, to illuminate a photometer. I prefer to construct the basic objective of four air-spaced members of which all but the third one are positively refractive (as also disclosed in the above-identified patent and copending application) with the proviso that the air spaced immediately preceding the negatively refractive third member of this basic objective has a width less than the axial thicknesses of the first and second positive members thereof and that the air space following the negative third member ranges between substantially 10% and 20% of the total axial length of the basic objective.

An objective system according to my present invention, embodying the features set forth above, has as its fixed positive front component a positive meniscus preceded by one or more members of combined positive refractivity; the latter members may include, as disclosed in my copending prior application (U.S. Patent 3,346,320), two positive lenses preceded by a negative front lens of preferably biconcave configuration.

Figure 2:
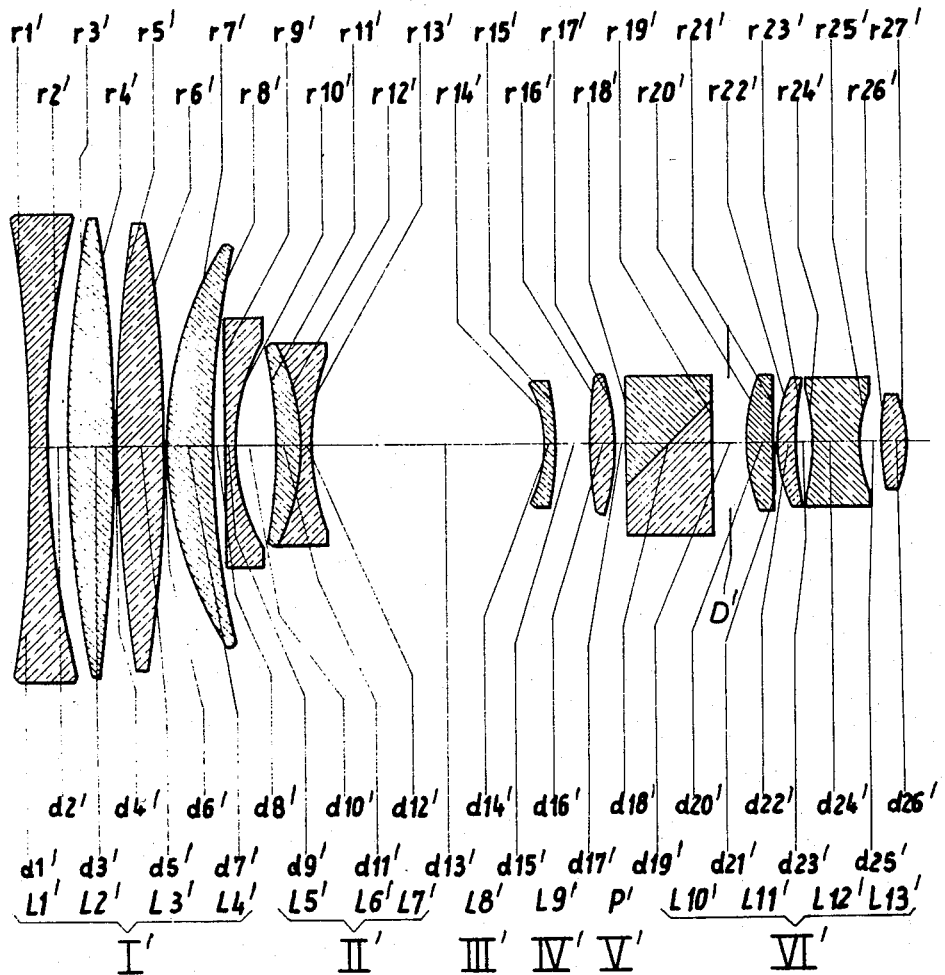

The invention will be described in greater detail with reference to the accompanying drawing in which FIGS. 1 and 2 diagrammatically illustrate two representative embodiments.

The objective system shown in FIG. 1 comprises a varifocal group, constituted by four components I–IV, and a four-member fixed group constituting a principal objective VI. Interposed between these groups are a combination of accessories including an afocal component V, in the form of a reflex prism P, and a diaphragm D.

The front component I of the varifocal group includes a positive doublet consisting of a biconvex lens $L_1$ (radii $r_1$, $r_2$ and thickness $d_1$) cemented onto a concavoconvex lens $L_2$ (radii $r_2$, $r_3$ and thickness $d_2$); it further includes a positive meniscus $L_3$ (radii $r_4$, $r_5$ and thickness $d_4$) separated from the doublet $L_1$, $L_2$ by a small air space $d_3$. The second component II, which is of dispersive character, also consists of two air-spaced lens members, i.e., a negative meniscus $L_4$ (radii $r_6$, $r_7$ and thickness $d_6$) with a concave rear surface and an achromatic doublet composed of lenses $L_5$ (radii $r_8$, $r_9$ and thickness $d_8$) and $L_6$ (radii $r_9$, $r_{10}$ and thickness $d_9$), this doublet being of biconcave shape and being jointly displaceable with singlet $L_4$ so as to maintain a constant air space $d_7$ therebetween. Component II is separated from component I by a variable air space $d_5$ and from component III, a negative meniscus (radii $r_{11}$, $r_{12}$ and thickness $d_{11}$) with concave front surface, by a variable air space $d_{10}$; another variable air space $d_{12}$ separates meniscus $L_7$ from a biconvex positive lens $L_8$ (radii $r_{13}$, $r_{14}$ and thickness $d_{13}$) representing the fixed rear component IV. The latter component is separated from basic obejctive VI by a large air space of constant width composed of a space $d_{14}$ between lens $L_8$ and prism P (whose front and rear surfaces have been designated $r_{15}$, $r_{16}$), the thickness $d_{15}$ of this prism and a further space $d_{16}$ accommodating the diaphragm D. The basic objective VI consists of a first positive singlet $L_9$ (radii $r_{17}$, $r_{18}$ and thickness $d_{17}$) a second positive singlet $L_{10}$ (radii $r_{19}$, $r_{20}$ and thickness $d_{19}$), a biconcave negative singlet $L_{11}$ (radii $r_{21}$, $r_{22}$ and thickness $d_{21}$) and a biconvex positive singlet $L_{12}$ (radii $r_{23}$, $r_{24}$ and thickness $d_{23}$), the intervening air spaces having been designated $d_{18}$, $d_{20}$ and $d_{22}$).

Representative values of the parameters $r_1$ to $r_{24}$ and $d_1$ to $d_{23}$ of the system of FIG. 1, given in units of length such as millimeters, along with the refractive indicies $n_d$ and the Abbé numbers (based upon the yellow $d$-line of the spectrum) are listed in the following Table I for a system of relative aperture 1:1.8 and of back-focal length equal to 13.1 units of length, with an overall focal length ranging from a minimum value $f_{min}=8$ to a maximum value $f_{max}=40$.

TABLE I

| Lens | | Radii | Thicknesses and Separations | $n_d$ | $\nu$ |
|---|---|---|---|---|---|
| I | $L_1$ | $r_1=+60.03$ | $d_1=7.50$ | 1.62299 | 58.12 |
| | | $r_2=-86.80$ | $d_2=2.00$ | 1.80518 | 25.46 |
| | $L_2$ | $r_3=+749.50$ | $d_3=0.10$ | air space | |
| | $L_3$ | $r_4=+51.43$ | $d_4=4.30$ | 1.62299 | 58.12 |
| | | $r_5=+358.50$ | $d_5=0.47$-$27.28$ | variable air space | |
| II | $L_4$ | $r_6=+200.40$ | $d_6=1.00$ | 1.67790 | 55.52 |
| | | $r_7=+16.28$ | $d_7=4.60$ | air space | |
| | $L_5$ | $r_8=-25.00$ | $d_8=2.10$ | 1.80518 | 25.46 |
| | | $r_9=-15.61$ | $d_9=1.00$ | 1.46450 | 65.79 |
| | $L_6$ | $r_{10}=+43.09$ | $d_{10}=27.74$-$1.78$ | variable air space | |
| III | $L_7$ | $r_{11}=-10.84$ | $d_{11}=1.00$ | 1.62041 | 60.29 |
| | | $r_{12}=-23.02$ | $d_{12}=1.69$-$0.84$ | variable air space | |
| IV | $L_8$ | $r_{13}=+64.68$ | $d_{13}=2.20$ | 1.62230 | 53.14 |
| | | $r_{14}=-20.36$ | $d_{14}=1.00$ | air space | |
| V | P | $r_{15}=\infty$ | $d_{15}=9.00$ | 1.51680 | 64.20 |
| | | $r_{16}=\infty$ | $d_{16}=3.50$ | air space | |
| VI | $L_9$ | $r_{17}=+21.71$ | $d_{17}=2.55$ | 1.67790 | 55.52 |
| | | $r_{18}=+246.20$ | $d_{18}=0.05$ | air space | |
| | $L_{10}$ | $r_{19}=+15.30$ | $d_{19}=1.80$ | 1.74400 | 44.90 |
| | | $r_{20}=+97.46$ | $d_{20}=1.40$ | air space | |
| | $L_{11}$ | $r_{21}=-24.50$ | $d_{21}=4.90$ | 1.78470 | 26.10 |
| | | $r_{22}=+8.82$ | $d_{22}=2.25$ | air space | |
| | $L_{12}$ | $r_{23}=+16.77$ | $d_{23}=2.45$ | 1.71300 | 53.89 |
| | | $r_{24}=-12.90$ | | | |
| | | | $d_{total}=84.60$ | | |

In the system defined by Table I, the individual total lengths of components I, II, III, IV and VI have the following values:

$$f_I = 57.99$$
$$f_{II} = -16.0$$
$$f_{III} = -33.96$$
$$f_{IV} = 25.02$$
$$f_{VI} = 19.49$$

The variable air spaces $d_5$, $d_{10}$ and $d_{16}$ must, of course, add up to a constant value in all operative positions of the system, their sum in this case being 29.9. From this relationship and from the principles of conventional optics, such as the well-known Gaussian formulas, it is readily possible to determine the position of one of the two movable components (e.g., III) for every position of the other movable component II since the back-focal length has to be the same in all instances. In addition to the limiting values given in the Table, these variable air spaces may assume an infinite number of intermediate values of which one set is as follows:

$$d_5 = 18.13$$
$$d_{10} = 8.34$$
$$d_{12} = 3.43$$

It will be noted that the total axial length of group VI is equal to 15.4 units and that the air space $d_{22}$ lies between 0.1 and 0.2 times that value. Also, air space $d_{20}$ is smaller than either thickness $d_{17}$ or $d_{19}$. Furthermore, the ratio $r_{10}/r_{11}$ has an absolute value equal to 3.98 which is greater than $0.8f_{III}/f_{II}$ but less than $10f_{II}/f_{III}$, i.e., $1.69 < 3.98 < 4.71$; also, the absolute value of the ratio $r_7/r_9$ ranges between $|0.05f_{II}|$ and $|0.15f_{II}|$, i.e., $0.8 < 1.04 < 2.4$.

In FIG. 2 I have illustrated a system generally similar to that of FIG. 1, the corresponding components having been designated I′, II′, III′, IV′, V′ and VI′. Component I′ differs from component I of FIG. 1 in that it is composed of four air spaced singlets, i.e. a biconcave first lens $L_1'$ (radii $r_1'$, $r_2'$ and thickness $d_1'$), a biconvex second lens $L_2'$ (radii $r_3'$, $r_4'$ and thickness $d_3'$), another biconvex third lens $L_3'$ (radii $r_5'$, $r_6'$ and thickness $d_5'$) and a positive meniscus $L_4'$ (radii $r_7'$, $r_8'$ and thickness $d_7'$), with intermediate air space $d_2'$, $d_4'$ and $d_6'$. The three variable air spaces in the system of FIG. 2 have been indicated as $d_8'$, $d_{13}'$ and $d_{15}'$. The remaining lens members $L_5'$ to $L_{13}'$, with radii $r_9'$ to $r_{27}'$ and with thicknesses and separations $d_9'$ to $d_{26}'$, are substantially identical with lenses $L_4$ to $L_{12}$, respectively, of the preceding emobdiment. A diaphragm D′ is juxtaposed with prism P′ constituting the afocal component V′.

Representative values of the parameters of the system of FIG. 2 are listed in the following Table II, this system having again a relative aperture of 1:1.8 and a back-focal length of 13.1 units; in this case, however, the verifocal ratio is increased to a value of 1:8, with $f_{min}=7$ and $f_{max}=56$.

TABLE II

| Lens | | Radii | Thicknesses and Separations | $n_d$ | $\nu$ |
|---|---|---|---|---|---|
| I′ | $L_1'$ | $r_1'=-152.00$ | $d_1'=1.80$ | 1.74080 | 28.05 |
| | | $r_2'=+90.90$ | $d_2'=1.80$ | air space | |
| | $L_2'$ | $r_3'=+109.66$ | $d_3'=4.70$ | 1.62041 | 60.29 |
| | | $r_4'=-165.85$ | $d_4'=0.10$ | air space | |
| | $L_3'$ | $r_5'=+132.70$ | $d_5'=4.70$ | 1.62041 | 60.29 |
| | | $r_6'=+132.70$ | $d_6'=0.10$ | air space | |
| | $L_4'$ | $r_7'=+35.49$ | $d_7'=4.65$ | 1.62299 | 58.12 |
| | | $r_8'=+86.80$ | $d_8'=1.01$-$32.77$ | variable air space | |
| II′ | $L_5'$ | $r_9=+300.40$ | $d_9'=1.00$ | 1.62041 | 60.29 |
| | | $r_{10}'=+18.20$ | $d_{10}'=3.90$ | air space | |
| | $L_6'$ | $r_{11}'=-65.91$ | $d_{11}'=2.85$ | 1.80518 | 25.46 |
| | $L_7'$ | $r_{12}'=-20.61$ | $d_{12}'=1.00$ | 1.60310 | 65.63 |
| | | $r_{13}'=+25.82$ | $d_{13}'=30.77$-$2.50$ | air space (variable) | |
| III′ | $L_8'$ | $r_{14}'=-11.37$ | $d_{14}'=1.00$ | 1.62041 | 60.29 |
| | | $r_{15}'=-33.35$ | $d_{15}'=4.02$-$0.53$ | variable air space | |

TABLE II—Continued

| Lens | | Radii | Thicknesses and Separations | $n_d$ | $\nu$ |
|---|---|---|---|---|---|
| IV'  | L₉' | $r_{16}'=+60.71$ | $d_{16}'=2.40$ | 1.62280 | 56.88 |
| | | $r_{17}'=-20.72$ | $d_{17}'=1.00$ | air space | |
| V' | P' | $r_{18}'=\infty$ | $d_{18}'=9.00$ | 1.51680 | 64.20 |
| | | $r_{19}'=\infty$ | $d_{19}'=3.50$ | air space | |
| VI' | L₁₀' | $r_{20}'=+17.48$ | $d_{20}'=2.55$ | 1.69100 | 54.80 |
| | | $r_{21}'=-579.00$ | $d_{21}'=0.05$ | air space | |
| | L₁₁' | $r_{22}'=+13.72$ | $d_{22}'=1.80$ | 1.69100 | 54.80 |
| | | $r_{23}'=+30.04$ | $d_{23}'=1.40$ | air space | |
| | L₁₂' | $r_{24}'=-26.82$ | $d_{24}'=4.90$ | 1.80518 | 25.46 |
| | | $r_{25}'=+10.48$ | $d_{25}'=2.25$ | air space | |
| | L₁₃' | $r_{26}'=+28.68$ | $d_{26}'=2.45$ | 1.71700 | 47.90 |
| | | $r_{27}'=-13.32$ | | | |

$d_{total}=94.70$

The individual focal lengths of components I', II', III', IV' and VI' are as follows:

$$f_{I'}=56.01$$
$$f_{II'}=-16.01$$
$$f_{III'}=-28.19$$
$$f_{IV'}=24.98$$
$$f_{VI'}=21.50$$

A set of representative intermediate values for the variable air spaces $d_8'$, $d_{13}'$ and $d_{15}'$, which in every position add up to 35.8, is as follows:

$$d_8' = 24.29$$
$$d_{13}' = 6.34$$
$$d_{15}' = 5.17$$

With the total axial length of group VI' amounting again to 15.4 units, the last air space $d_{25}'$ again lies in the range of 0.1 to 0.2 times that length. The preceding air space $d_{23}'$ is, as before, smaller than the axial thicknesses $d_{20}'$ and $d_{22}'$. The ratio of radii $r_{13}'/r_{14}'$ has an absolute value of 2.27 ranging between $0.8f_{III'}/f_{II'}$ and $10f_{II'}/f_{III'}$, i.e., $1.41<2.27<5.68$. The absolute value of the ratio $r_{10}'/r_{12}'$ lies between $|0.305f_{II'}|$ and $|0.15f_{II'}|$, i.e. $0.8<0.88<2.4$.

The air space $d_{14}+d_{15}+d_{16}$ (FIG. 1) or $d_{17}'+d_{18}'+d_{19}'$ (FIG. 2), separating the last component IV or IV' of the varifocal group from the basic objective VI or VI', measures in each case 13.5 units and is thus only slightly less than the total axial length of that basic objective.

I claim:

1. An optical objective system comprising a fixed-focus rear lens group composed of four air-spaced lens members and a forward lens group consisting of a substantially fixed positive first component, an axially movable negative second component composed of a meniscus-shaped dispersive singlet and an achromatic dispersive doublet following said singlet, an axially movable negative third component and a fixed positive fourth component, said air-spaced lens members being singlets and consisting of a positive first lens, a positive second lens, a negative third lens and a positive fourth lens, an afocal component interposed in the air space between said forward and rear lens groups, said first component consisting of a positive doublet and a positive meniscus following said doublet, the numerical values of the radii of curvature $r_1$ to $r_{24}$ and thicknesses and separations $d_1$ to $d_{23}$ of two lenses $L_1$, $L_2$ constituting said positive doublet, a lens $L_3$ representing said positive meniscus, a lens $L_4$ representing said dispersive singlet, two lenses $L_5$, $L_6$ constituting said achromatic doublet, a lens $L_7$ representing said third component, a lens $L_8$ representing said fourth component, a prism P representing said afocal component, and lenses $L_9$, $L_{10}$, $L_{11}$, $L_{12}$ together constituting said rear lens group, based upon an overall focal length of numerical value variable between 8 and 40 units, their refractive indices $n_d$ and their Abbé numbers $\nu$ being substantially as given in the following table:

| Lens | Radii | Thicknesses and Separations | $n_d$ | $\nu$ |
|---|---|---|---|---|
| L₁ | $r_1=+60.03$ | $d_1=7.50$ | 1.62299 | 58.12 |
| | $r_2=-86.80$ | $d_2=2.00$ | 1.80518 | 25.46 |
| L₂ | $r_3=+749.50$ | $d_3=0.10$ | air space | |
| L₃ | $r_4=+51.43$ | $d_4=4.30$ | 1.62299 | 58.12 |
| | $r_5=+358.50$ | $d_5=0.47$-27.28 | variable air space | |
| L₄ | $r_6=+200.40$ | $d_6=1.00$ | 1.67790 | 55.52 |
| | $r_7=+16.28$ | $d_7=4.60$ | air space | |
| L₅ | $r_8=-25.00$ | $d_8=2.10$ | 1.80518 | 25.46 |
| L₆ | $r_9=-15.61$ | $d_9=1.00$ | 1.46450 | 65.79 |
| | $r_{10}=+43.09$ | $d_{10}=27.74$-1.78 | variable air space | |
| L₇ | $r_{11}=-10.84$ | $d_{11}=1.00$ | 1.62041 | 60.29 |
| | $r_{12}=-23.02$ | $d_{12}=1.69$-0.84 | variable air space | |
| L₈ | $r_{13}=+64.68$ | $d_{13}=2.20$ | 1.62230 | 53.14 |
| | $r_{14}=-20.36$ | $d_{14}=1.00$ | air space | |
| P | $r_{15}=\infty$ | $d_{15}=9.00$ | 1.51680 | 64.20 |
| | $r_{16}=\infty$ | $d_{16}=3.50$ | air space | |
| L₉ | $r_{17}=+21.71$ | $d_{17}=2.55$ | 1.67790 | 55.52 |
| | $r_{18}=+246.20$ | $d_{18}=0.05$ | air space | |
| L₁₀ | $r_{19}=+15.30$ | $d_{19}=1.80$ | 1.74400 | 44.90 |
| | $r_{20}=+97.46$ | $d_{20}=1.40$ | air space | |
| L₁₁ | $r_{21}=-24.50$ | $d_{21}=4.90$ | 1.78470 | 26.10 |
| | $r_{22}=+8.82$ | $d_{22}=2.25$ | air space | |
| L₁₂ | $r_{23}=+16.77$ | $d_{23}=2.45$ | 1.71300 | 53.89 |
| | $r_{24}=-12.90$ | | | |

2. An optical objective system comprising a fixed-focus rear-lens group composed of four air-spaced lens members and a forward lens group consisting of a substantially fixed positive first component, an axially movable negative second component composed of a meniscus-shaped dispersive singlet and an achromatic dispersive doublet following said singlet, and axially movable negative third component and a fixed positive fourth component, said air-spaced lens members being singlets and consisting of a positive first lens, a positive second lens, a negative third lens and a positive fourth lens, an afocal component interposed in the air space between said forward and rear lens groups, said first component consisting of a biconcave front lens, two biconvex lenses following said front lens and a positive meniscus following said biconvex lens, the numerical values of the radii $r_1'$ to $r_{27}'$ and thicknesses and separations $d_1'$ to $d_{28}'$ of biconcave front lens $L_1'$, said biconvex lenses $L_2'$, $L_3'$, said positive meniscus $L_4'$, a lens $L_5'$ representing said dispersive singlet, two lenses $L_6'$, $L_7'$ constituting said achromatic doublet, a lens $L_8'$ representing said third component, a lens $L_9'$ representing said fourth component, a prism P' representing said afocal component, said lenses $L_{10}'$, $L_{11}'$, $L_{12}'$, $L_{13}'$ together constituting said rear lens group, based upon an overall focal length of numerical value variable between 7 and 56 units, their refractive indices $n_d$ and their Abbé numbers $\nu$ being substantially as given in the following table:

| Lens | Radii | Thicknesses and Separations | $n_d$ | $\nu$ |
|---|---|---|---|---|
| $L_1'$ | $r_1'=-152.00$ | $d_1'=1.80$ | 1.74080 | 28.05 |
| | $r_2'=+90.90$ | $d_2'=1.80$ | air space | |
| $L_2'$ | $r_3'=+109.66$ | $d_3'=4.70$ | 1.62041 | 60.29 |
| | $r_4'=-165.85$ | $d_4'=0.10$ | air space | |
| $L_3'$ | $r_5'=+132.70$ | $d_5'=4.70$ | 1.62041 | 60.29 |
| | $r_6'=+132.70$ | $d_6'=0.10$ | air space | |
| $L_4'$ | $r_7'=+35.49$ | $d_7'=4.65$ | 1.62299 | 58.12 |
| | $r_8'=+86.80$ | $d_8'=1.01$–$32.77$ | variable air space | |
| $L_5'$ | $r_9'=+300.40$ | $d_9'=1.00$ | 1.62041 | 60.29 |
| | $r_{10}'=+18.20$ | $d_{10}'=3.90$ | air space | |
| $L_6'$ | $r_{11}'=-65.91$ | $d_{11}'=2.85$ | 1.80518 | 25.46 |
| $L_7'$ | $r_{12}'=-20.61$ | $d_{12}'=1.00$ | 1.60310 | 65.63 |
| | $r_{13}'=+25.82$ | $d_{13}'=30.77$–$2.50$ | variable air space | |
| $L_8'$ | $r_{14}'=-11.37$ | $d_{14}'=1.00$ | 1.62041 | 60.29 |
| | $r_{15}'=-33.35$ | $d_{15}'=4.02$–$0.53$ | variable air space | |
| $L_9'$ | $r_{16}'=+60.71$ | $d_{16}'=2.40$ | 1.62280 | 56.88 |
| | $r_{17}'=-20.72$ | $d_{17}'=1.00$ | air space | |
| $P'$ | $r_{18}'=\infty$ | $d_{18}'=9.00$ | 1.51680 | 64.20 |
| | $r_{19}'=\infty$ | $d_{19}'=3.50$ | air space | |
| $L_{10}'$ | $r_{20}'=+17.48$ | $d_{20}'=2.55$ | 1.69100 | 54.80 |
| | $r_{21}'=-579.00$ | $d_{21}'=0.05$ | air space | |
| $L_{11}'$ | $r_{22}'=+13.72$ | $d_{22}'=1.80$ | 1.69100 | 54.80 |
| | $r_{23}'=+30.04$ | $d_{23}'=1.40$ | air space | |
| $L_{12}'$ | $r_{24}'=-26.82$ | $d_{24}'=4.90$ | 1.80518 | 25.46 |
| | $r_{25}'=+10.48$ | $d_{25}'=2.25$ | air space | |
| $L_{13}'$ | $r_{26}'=+28.68$ | $d_{26}'=2.45$ | 1.71700 | 47.90 |
| | $r_{27}'=-13.32$ | | | |

References Cited

UNITED STATES PATENTS 3,273,457  9/1966  Macher et al. _____ 350—184

FOREIGN PATENTS 942,966  11/1963  Great Britain.

JOHN K. CORBIN, *Primary Examiner.*

U.S. Cl. X.R.

350—184, 202, 214, 223